Oct. 10, 1967  L. J. COLLINS  3,345,744
VAT FOR SETTING AND AGITATING COTTAGE CHEESE
Filed Jan. 11, 1966   2 Sheets-Sheet 1

INVENTOR.
LOWELL J. COLLINS
BY
John J. Leavitt

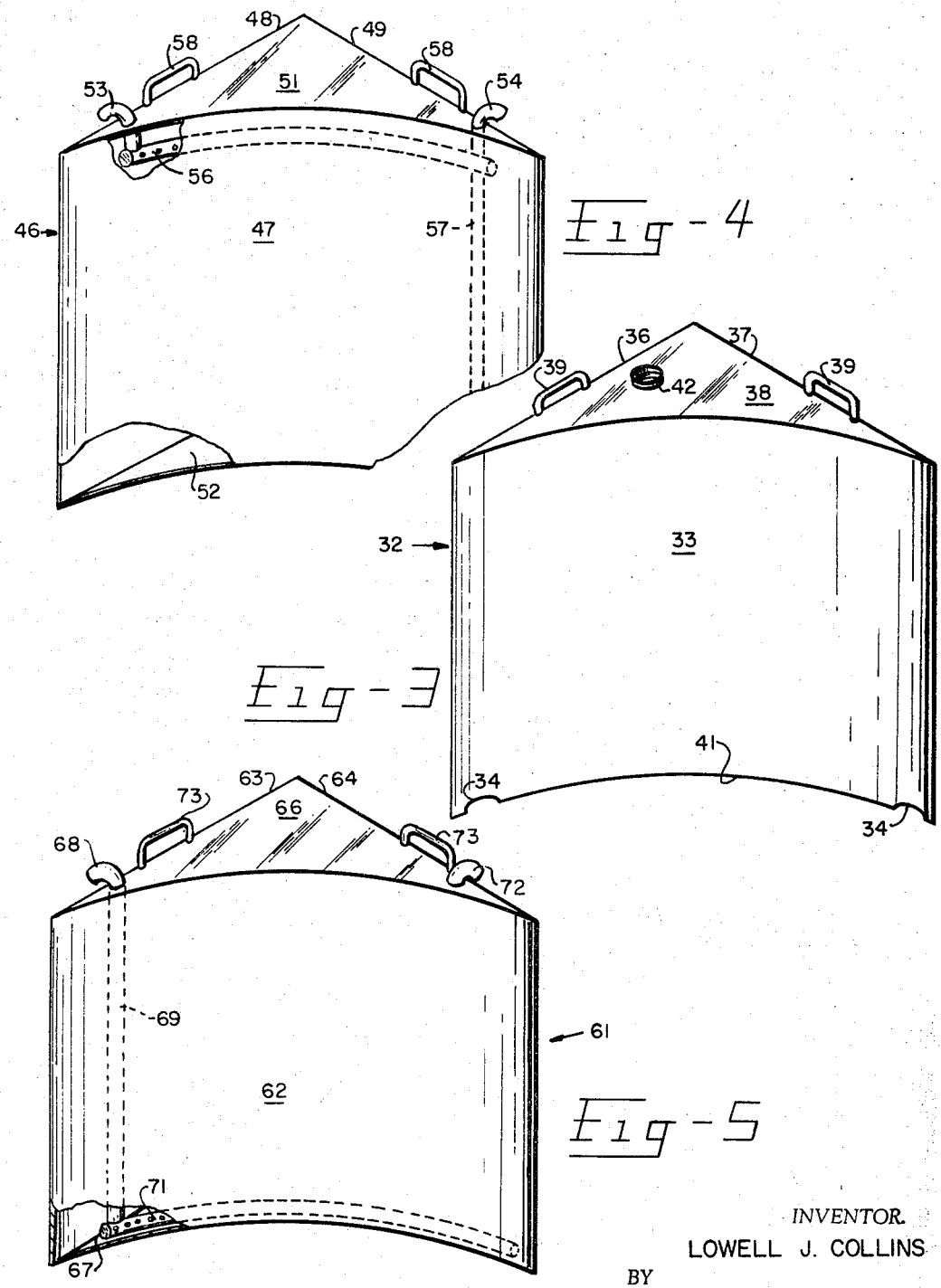

# 3,345,744
VAT FOR SETTING AND AGITATING
COTTAGE CHEESE
Lowell J. Collins, Piedmont, Calif. (936 61st Ave.,
Oakland, Calif. 94621); Rose Helen Collins, executrix of said Lowell J. Collins, deceased
Filed Jan. 11, 1966, Ser. No. 519,867
10 Claims. (Cl. 31—47)

The invention relates to the art of cheese manufacture, and more particularly to the construction of the vat in which the cheese is produced, so as to permit performance of the various steps required to be performed in an expeditious manner while insuring production of a top quality product, with maximum curd yield.

The manufacture of cottage and chedder cheeses still involves the use of much hand labor, despite recent attempts to mechanize this art, as evidenced by the issuance of United States Patents 3,193,928 and 3,193,929 to the inventor of the instant invention. Both those patents disclose apparatus designed to agitate the vast body of the curd after it has been cut into small cubes. As pointed out in those patents, a rectangular vat with square corners is the most efficient vat configuration in consideration of the cutting operation because the set and uncut curd may be cut into even-sized cubes most expeditiously in a vat of this shape.

On the other hand, since it is difficult to agitate curd which lies within the confines of a square corner of the vat, from the viewpoint of agitation of the curd during the cooking process, the most efficient vat configuration is one having a semi-circular end wall. A vat such as this is disclosed in United States Patent 2,774,140, in which it is shown that a rotary type agitator can agitate the curd more efficiently if the end of the vat is rounded or semicircular. Additional problems encountered in agitating the curd in a large vat may be gleaned from United States Patents 2,488,053 and 2,617,191, both of which pertain to mechanisms for forking the curd during the cooking cycle and thereafter when it is desired to separate the curd from the whey.

In brief, cottage cheese, for instance, is manufactured from sweet milk which is placed into a large vat of the order of about 2500 gallons' capacity. The milk is heated to a proper temperature conducive to ripening, and the proper ingredients added to cause the milk to set into a curd. After the curd has set, it must be cut into relatively small cubes, this operation being performed manually by the cheesemaker by repeatedly passing cheese knives through the body of the cheese. A cheese knife often takes the form of a large stainless steel paddle in the form of a grid which is passed through the curd. Such paddles are usually rectangular and unwieldly, requiring considerable physical exertion to manipulate, particularly in the corners. It is important that the knives be wielded in a manner to produce curd cubes of uniform size because uniformity of size has an important bearing on the uniformity with which the entire body of curd may be heated and cooked. Curd cubes of irregular sizes would promote irregular cooking of the curd, thus effecting its flavor and the saleable yield from a specific batch.

From the foregoing it will be apparent that if the vat is formed with a rounded end during the cutting operation, the rectangular knife would be especially difficult if not impossible to wield in a manner which would produce uniform cubes of curd.

Accordingly, it is one of the principal objects of the invention to provide a vat which possesses substantially square corners during the cutting operation and which may then be converted into a vat having rounded ends or rounded corners during the cooking and draining operations.

There are several different processes used for cooking cheese curd, depending upon the heritage of the artisan cheesemaker. For instance, some cheesemakers prefer to surround the vat with a water jacket through which is circulated hot water, with heat transfer to the cheese being effected through the wall of the vat. Other cheesemakers prefer to circulate steam through such a jacket surrounding the vat, or spray hot water against the sides of the vat, while others prefer to admix steam or water directly with the curd during the agitating and cooking cycle. It is therefore another object of the invention to provide a system of baffles for the interior of a cottage cheese vat to accommodate all the usual methods of heating or agitating the curd while converting the square corners of the vat into rounded corners to facilitate agitation during cooking.

The invention possesses other objects and features of advantage, some of which, with the foregoing, will become apparent from the following description and the drawings. It is to be understood however that the invention is not limited to the particular embodiment illustrated and described, as it may be embodied in various forms within the scope of the appended claims.

Referring to the drawings;

FIG. 3 is a perspective view of another embodiment of a baffle having an impervious face plate but open at its bottom end.

FIG. 4 is a perspective view of still another embodiment of a baffle, this one having an impervious face plate but a closed bottom end, and adapted to be utilized with a full flooded jacket-type heating system.

FIG. 5 is a perspective view of another embodiment of a baffle, being somewhat similar to the full-flooded type shown in FIG. 4.

Broadly considered, the vat of my invention comprises a vat which is convertible from a square-ended vat to a rounded-corner vat after completion of the cheese cutting operation, by a system of baffles, to thus facilitate both the cutting and agitating and cooking operations. The vat is converted by inserting into each corner a baffle which locks to the vat and is held in place therein partly by such locking mechanism and partly by the weight of the curd pressing thereagainst. Means are provided in association with each baffle to heat the curd thereagainst so that the entire body of curd may be cooked uniformly.

Figure 1A:
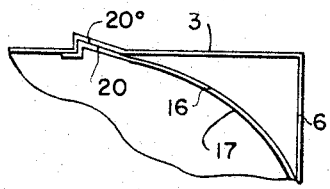
FIG. 1A is a fragmentary sectional view showing one method of locking the baffle in position.
Figure 1:
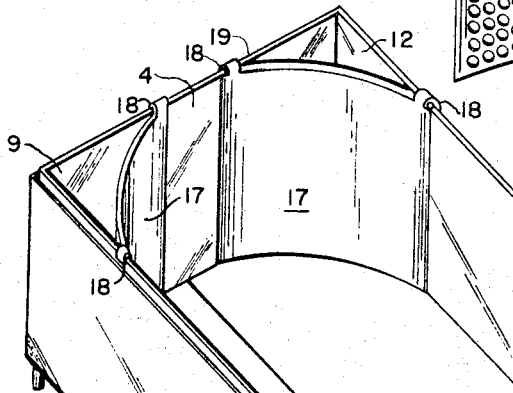
FIG. 1 is a perspective view on a reduced scale of a cheese vat showing the baffle system installed in the corners thereof.
Figure 1:
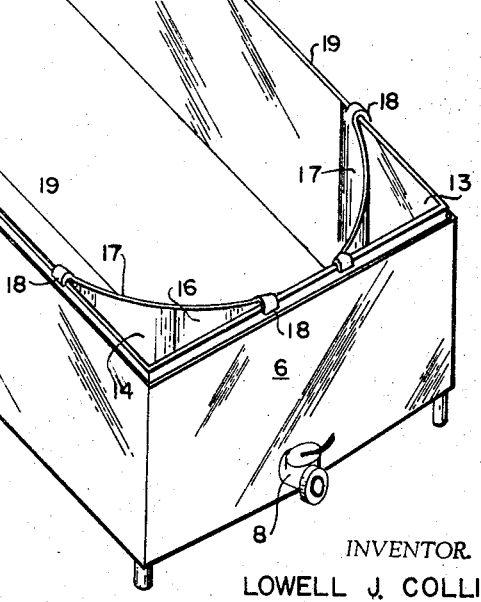

In more specific detail, and referring to FIG. 1, the vat of my invention comprises an elongated, generally rectangular container having side walls 2 and 3, end walls 4 and 6, and a bottom 7. The vat is equipped with an appropriate valve 8 for draining the contents of the vat, such as whey and curd.

As previously discussed, for maximum efficiency in the cutting operation, the vat is fabricated with square corners 9, 12, 13 and 14 so that the curd knife may cut uniform cubes of curd even in the corners of the vat. After cutting, the curds are permitted to rest and to expel their whey. At this point, heat is applied and agitation of the mixture commences so as to induce uniform cooking. Agitation is effected either mechanically with an agitating mechanism as indicated in U.S. Patent 3,193,929, or manually with paddles handled by the cheesemaker. It is at this point that it is desirable to convert the vat from a square-ended vat to one having rounded corners, since the round-corner vat permits more efficient agitation by mechanical means.

To convert the square ended vat to one having rounded corners, each corner of the vat is equipped with a baffle 16 as shown in FIG. 1, having a curved face 17, and in its simplest form constituting a curved sheet of light gauge stainless steel, curved about an appropriate radius determined by the width of the vat, or the span of the mechanical agitating paddles. The edges of each curved baffle sheet may be provided with fastening means of any desired type such as a tab 18 on each of two upper corners which engage the upper edge 19 of the vat when the baffle is dropped into place as shown, or a bayonet-lock (not shown) or projections 20 on the baffle extending into appropriate depressions 20' formed in the vat walls as shown in FIG. 1A. With both vertical edges of the baffle anchored, it is apparent that the inherent resilience of the stainless steel sheet baffle will retain the baffle locked in position. Thus, the mechanized forking apparatus for agitating the curd is enabled to agitate the entire body of milk solids within the vat because none of the milk solids are trapped in the corners.

Figure 2:
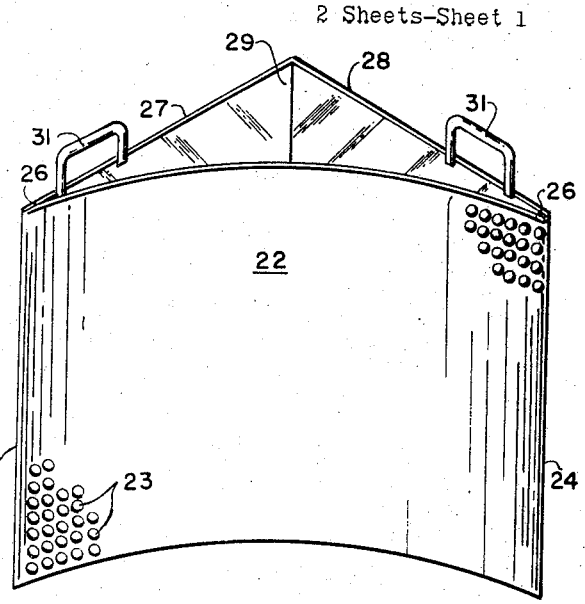
FIG. 2 is a perspective view of a baffle having a perforated face plate.

In FIG. 2 is illustrated a different embodiment of the baffle shown in FIG. 1. This baffle 21 is utilized in the same manner as the baffle 16, but differs in that the baffle is self-supporting. A curved face plate 22, having apertures 23, is secured at its vertical edges 24 to the associated vertical edges 26 of back plates 27 and 28 arranged at right angles so as to form a corner 29. Handles 31 are provided attached to the upper edge of the back plates to facilitate placement of the baffle. Besides being self-supporting, another advantage of this type baffle is that the apertured face plate facilitates passage of the whey from the main body of the curd into the corner which is devoid of curd because the baffle has kept them out. The whey within the corner comes into contact with the heated sides of the vat and then re-circulates out into the main body of curd. Cooking efficiency is therefore increased over the baffle design shown in FIG. 1 because the entire heating surfaces of the vat are utilized.

Another advantage of this type baffle is that it permits cooking with steam by inserting steam pipes into each corner behind the baffle and permitting the steam to heat the whey which then circulates throughout the body of curds. The conventional method of steam heating for cooking purposes utilizes only one steam inlet pipe at one end of the vat with attendant non-uniformity of heating and cooking.

The embodiment illustrated in FIG. 3 shows a baffle 32 constructed as a self-supporting unit similar to the baffle 21 shown in FIG. 2, but having a curved face plate 33 which is impervious to the whey, i.e., the face plate is not provided with apertures over its entire surface. Rather, this baffle is provided with a face plate having only two relatively small apertures 34 in its bottom edge adjacent each corner. Back plates 36 and 37 enclose and lend rigidity to the structure, and a top plate 38 closes the opening between the back plates and face plate. Handles 39 are provided enabling placement of the baffle within the vat. This baffle is provided with an open end 41 opposite the top plate 38, and with anchoring means (not shown) which may be of the type discussed in connection with FIG. 1. A latch-type lock is preferred to prevent upward displacement of the baffle after it is set in place.

Some cheesemakers, being artisans and reluctant to vary their method of making cheese, insist on using heat derived from steam under low pressure to heat the curds. For these cheesemakers steam is admitted into the baffle through the fitting 42 fixed in top plate 38, and the pressure of the steam, or hot air if desired, forces the whey and suspended solids out of the apertures 34 at the bottom of the baffle. Since there will be an upward reaction on the baffle, it is important that it be latched in position to prevent upward displacement. The advantage of this baffle is that the steam not only agitates the whey and suspended curds in proximity of the apertures 34, which of course causes agitation of the entire body of curd, but it also heats the face plate 33 which is in direct contact with the whey and curds in the vat, thus utilizing the entire heating surfaces of the vat when steam heat is used in conjunction with a vat equipped with a steam jacket, such as in FIG. 1. For facility in application and cleaning, the top plate may be made removable from the back plates and face plate, which are placed within the vat first, with the top plate, equipped with the steam fitting 42, then being locked to the face and back plates to prevent displacement when the steam is applied. Any suitable locking means may be utilized.

For those cheesemakers who believe that the direct hot water spray type of heating provides a superior quality cheese, the baffle 46, shown in FIG. 4, having an impervious curved face plate 47, back plates 48 and 49 fastened to the face plate to render the baffle self-supporting, and closed at its upper end by a top plate 51 and at its bottom end by a bottom plate 52, is especially designed to complement the type vat utilized by these cheesemakers.

Pipe fittings 53 and 54, fastened in the top plate, connect with pipes 56 and 57, respectively, within the hollow interior of the baffle. The pipe 56, as shown, is provided with apertures through which hot water may be sprayed into the interior of the baffle to effect heating of the face plate thereof. The pipe 57 is utilized as an outlet to promote circulation of the hot water within the baffle. Appropriate control valves (not shown) are utilized to control injection of water into the baffle. Handles 58 facilitate lifting the baffle into and out of the vat. After use, when it is desired to lift the baffle from the vat, air under pressure may be connected to the fitting 53 to blow all moisture from the inside of the baffle and thus lighten it.

For use with a full-flooded water jacket type vat, which some cheesemakers prefer, the baffle 61 illustrated in FIG. 5 is provided. This baffle is provided with a face plate 62, connected at its vertical edges to back plates 63 and 64, and provided also with a top plate 66 and a bottom plate 67. A pipe fitting 68 on the top plate connects with a vertical pipe 69 within the baffle which in turn connects to an apertured pipe 71 extending transversely across the bottom of the baffle, as shown. Hot water admitted through fitting 68 fills the baffle and escapes through fitting 72 mounted in the top plate. As with the other baffles, suitable handles 73 are provided to enable lifting the baffle into and out of the vat.

From the foregoing it will be apparent that a system of baffles has been provided which effectively permits use of a square-ended vat for setting and cutting the curd, which thereafter may be converted into a vat having rounded corners or semi-circular ends to facilitate agitation and cooking of the curds.

I claim:

1. The combination comprising a square-ended cheesemaking vat having a bottom, side and end walls with adjacent side and end walls meeting at substantially a right angle and forming corners to contain the contents thereof during the setting and cutting operation of the cheese, and an arcuate vertical baffle wall means removably disposed within the vat at said corners to convert the square-ended vat to a vat having rounded ends to facilitate machine agitation of the cheese after cutting.

2. The combination according to claim 1, in which said baffle wall means includes a curved face plate detachably interposed between adjacent end and side walls at each end of the vat, the radius of curvature of the face plate being correlated to the radius of rotation of associated mechanical agitation means.

3. The combination according to claim 2, in which one of said curved face plates is detachably secured in each corner of the vat.

4. The combination according to claim 2, in which said curved face plate is provided with a multiplicity of apertures over its broad expanse, the size of the apertures being such that the face plate is impervious to the cut cheese but permits the whey to circulate therethrough.

5. The combination according to claim 2, in which means are provided on each baffle cooperating with the adjacent walls of the vat to detachably lock the baffle in operative position within the vat.

6. The combination according to claim 3, in which said curved face plate is secured to a pair of substantially mutually perpendicular back plates joined to form a corner on the convex side of the face plate so that when the baffle is removably secured within the vat the corner formed by the back plates complements the corner formed by the adjacent side and end walls of the vat.

7. The combination according to claim 6, in which handle means are provided on the baffle to facilitate placement and removal of the baffle from the vat.

8. The combination according to claim 6, in which said baffle is provided with an apertured top plate disposed between the curved face plate and the back plates to close one end of the baffle while the opposite end thereof remains open, at least one aperture in the face plate adjacent its edge remote from the top plate, and a coupling fitting on the top plate in association with the aperture therein so as to enable pumping a fluid under pressure into the interior of the baffle whereby whey and cheese are forced out of the interior thereof through the apertures in the face plate.

9. The combination according to claim 6, in which top and bottom plates are provided interposed between the curved face plate and back plates at each end thereof, and pipe fittings are provided on the top plate communicating with extensions thereof within the baffle to effect circulation of a heating medium therethrough.

10. A baffle for converting a square-ended vat equipped with rotary mechanical agitation means for rotation about a vertical axis to a round-ended vat comprising, a curved face plate having a radius of curvature correlated to the radius of rotation of the rotary mechanical agitation means, and means on the baffle to detachably lock the baffle in position within the vat, the curved face plate of the baffle when so locked within the vat standing substantially parallel to the vertical axis of rotation of the mechanical agitation means.

References Cited

UNITED STATES PATENTS

| | | | |
|---|---|---|---|
| 253,118 | 1/1882 | Simon | 31—47 |
| 796,877 | 8/1905 | Southard | 31—47 |
| 1,798,333 | 3/1931 | Marlowe et al. | 206—45.14 |
| 1,875,497 | 9/1932 | Richardson et al. | 229—14 |
| 2,324,636 | 7/1943 | Miollis | 31—47 X |
| 2,657,994 | 11/1953 | Miollis | 31—47 X |
| 2,774,140 | 12/1956 | Nessler et al. | 31—48 |

ALDRICH F. MEDBERY, *Primary Examiner.*